US006633415B1

United States Patent
Arafune et al.

(10) Patent No.: US 6,633,415 B1
(45) Date of Patent: Oct. 14, 2003

(54) IMAGE INPUT APPARATUS AND METHOD FOR CONTROLLING THE SAME

(75) Inventors: Shoji Arafune, Chichibu (JP); Tsutomu Takayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/533,747

(22) Filed: Mar. 23, 2000

(30) Foreign Application Priority Data

Mar. 26, 1999 (JP) ............................................. 11-084669
Mar. 15, 2000 (JP) ........................................ 2000-072268

(51) Int. Cl.[7] ................................................. H04N 1/04
(52) U.S. Cl. ...................... 358/474; 358/482; 358/463; 358/461; 358/465; 358/521; 358/3.27; 358/1.9; 358/447; 358/486; 382/275
(58) Field of Search ................................. 358/474, 482, 358/494, 463, 465, 521, 3.27, 1.9, 461, 447, 486; 382/275

(56) References Cited

U.S. PATENT DOCUMENTS 4,691,114 A * 9/1987 Hasegawa et al. .......... 358/474
4,933,983 A * 6/1990 Hiramatsu et al. .......... 382/112
5,047,871 A * 9/1991 Meyer et al. ................ 358/486
5,051,842 A * 9/1991 Shimazaki .................. 358/447
5,686,960 A * 11/1997 Sussman et al. .......... 348/218.1

* cited by examiner

Primary Examiner—Edward Coles
Assistant Examiner—Heather D Gibbs
(74) Attorney, Agent, or Firm—Robin, Blecker & Daley

(57) ABSTRACT

An image input apparatus for reading an original image by moving an optical unit with a motor used as a drive source is arranged such that, in repeatedly reading the original image from one and the same reading position with the optical unit, information on a start position at which a preceding round of reading has begun and a driving state of the motor obtained at that time is stored by a system controller, and the amount of moving the optical unit backward for the repeated reading is decided on the basis of the information stored. The arrangement enhances the repeatability of reading in the sub-scanning direction and image input can be made with a better resolution than the intrinsic resolution of the image input apparatus.

18 Claims, 17 Drawing Sheets

F I G. 7
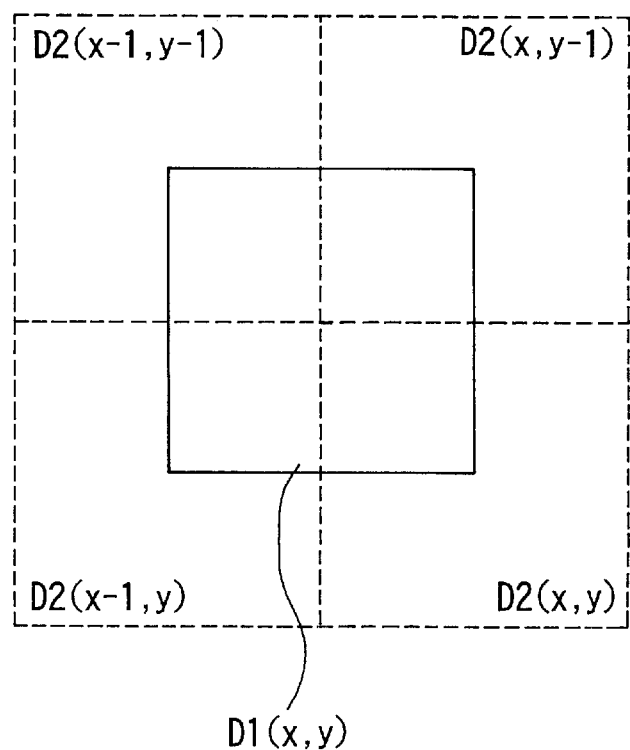

IMAGE INPUT APPARATUS AND METHOD FOR CONTROLLING THE SAME

BACKGROUND OF THE INVENTION

1. Field of the Invention

The present invention relates to an image input apparatus, and relates more particularly to an image input apparatus arranged to read an image by performing scanning a plurality of times in the direction of sub-scanning, and also to a method for controlling the operation of the image input apparatus.

2. Description of Related Art

Image input apparatuses typically represented by image scanners are generally arranged to have a reading original (a sheet of paper, a book or the like) put on an original-placing board made of transparent glass, to cause an optical unit having a light source and an optical system and disposed in a space below the original-placing board to reciprocate in the direction of sub-scanning (in the direction of lines), and to lead light thus obtained from the original to a sensor which is composed of a CCD (charge-coupled device) or the like.

During recent years, the advancement of art of manufacturing semiconductors has come to permit a complex image processing operation to be easily carried out with an image input apparatus of the above-stated kind. For example, it is conceivable to read an original image by scanning the original image a plurality of times in the sub-scanning direction and to combine images thus obtained.

However, the conventional image input apparatus has presented the following problem. In the image input apparatus, a driving force of a motor is transmitted to a mechanism for moving the optical unit through a transmission means such as gears, which are in mesh with each other. These gears have a clearance or play between them. The clearance causes some backlash, which makes it difficult to cause an image input part to accurately reciprocate in the sub-scanning direction. Thus, the backlash tends to deteriorate precision in the sub-scanning direction to bring about an image discrepancy in the sub-scanning direction. Hence, resolution in the sub-scanning direction has sometimes decreased due to such backlash.

BRIEF SUMMARY OF THE INVENTION

The present invention is directed to the solution of the problem of the prior art described above. It is, therefore, an object of the invention to provide an image input apparatus which is arranged to have a high degree of repeating accuracy in the sub-scanning direction.

To attain the above object, in accordance with an aspect of the invention, there is provided an image input apparatus, comprising an image sensor arranged to read an original image to convert the original image into an electrical signal, moving means for moving the original image and the image sensor relative to each other, and control means for, when the moving means moves one and the same portion of the original image and the image sensor relative to each other a plural number of times, controlling the plural-number-th-time movement according to a characteristic of the moving means, so that the repeating accuracy in the sub-scanning direction can be enhanced.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 7 is a diagram showing a pixel data arrangement of the image input apparatus according to the embodiment of the invention.

DETAILED DESCRIPTION OF THE INVENTION

Hereinafter, preferred embodiments of the invention will be described in detail with reference to the drawings.

First Embodiment

Figure 1A:
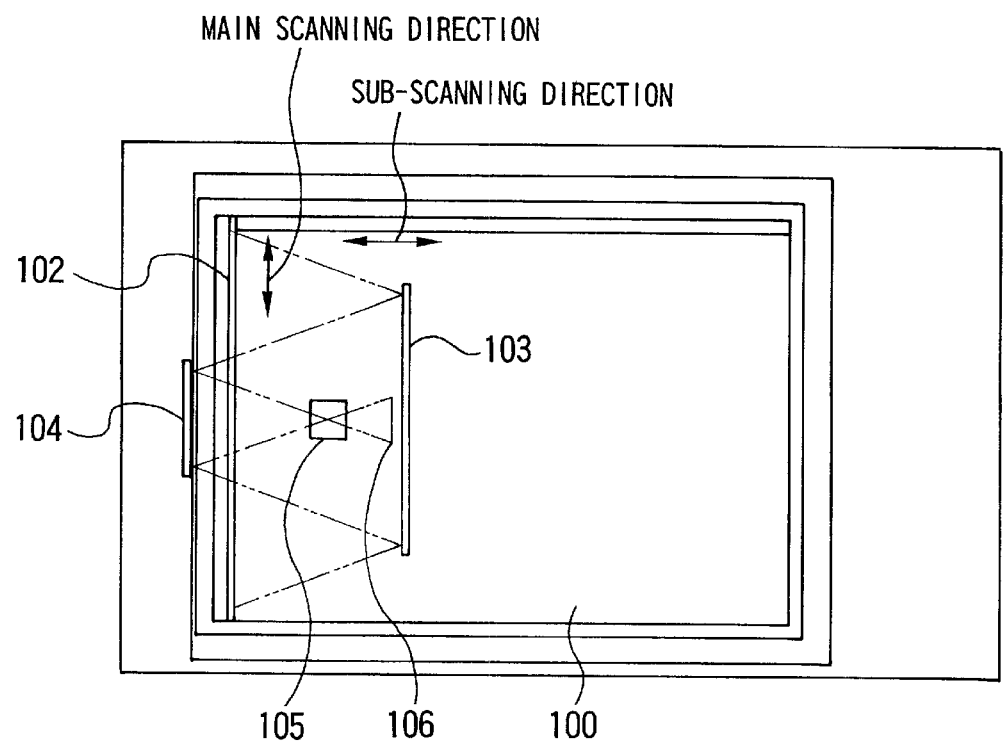
FIG. 1A is a top view of an image input apparatus according to an embodiment of the invention.
Figure 1B:
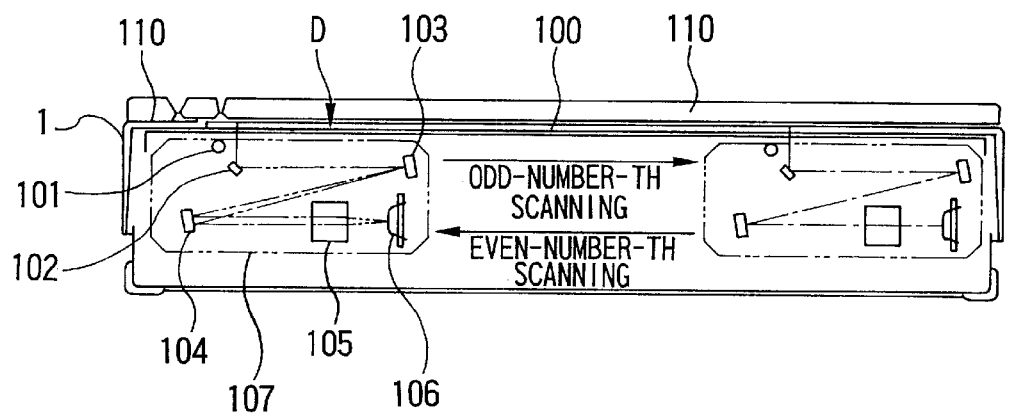
FIG. 1B is a side view of the image input apparatus according to the embodiment of the invention.

FIGS. 1A and 1B schematically show a flat-bed type scanner 1 which is an image input apparatus according to a first embodiment of the invention. FIG. 1A is a top view and FIG. 1B a side view of the flat-bed type scanner 1. Referring to FIGS. 1A and 1B, a reading original D is placed on the surface of an original-placing glass board 100. The original D is illuminated with a light source 101 which is a fluorescent lamp, a cold cathode-ray tube, a light emitting diode or the like. Then, light reflected from the original D is bent by mirrors 102, 103 and 104 to be imaged through a lens 105 on a CCD 106. The light source 101, the mirrors 102, 103 and 104, the lens 105 and the CCD 106 are fixedly disposed within an optical unit 107. An image of the whole original D is read and scanned by moving the optical unit 107 in parallel with the original-placing glass board 100 from the left to the right as viewed in FIGS. 1A and 1B. By this scanning action, a one-page amount of an image signal is obtained from the CCD 106. In this instance, a main scanning direction is assumed to be the vertical direction and a sub-scanning direction is assumed to be the horizontal direction as viewed in FIG. 1A.

As shown in FIG. 1B, the reflected light from the original D is first led to the mirror 102. Then, a light image reflected by the mirror 102 is led to the mirror 104 through the mirror 103. The lens 105 is set on the reflection optical path of the mirror 104. The CCD (image sensor) 106 is disposed at the focus position of the lens 105.

Figure 2:
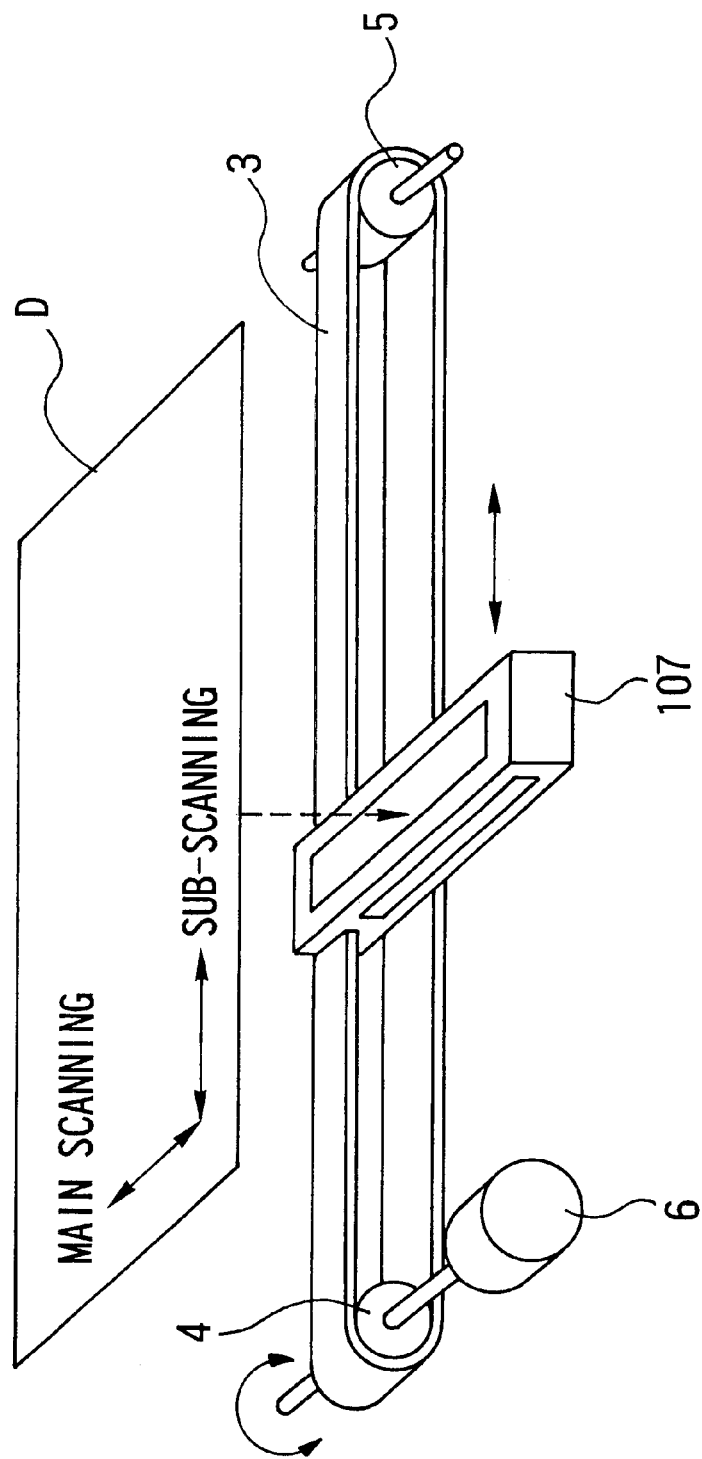
FIG. 2 is a perspective view showing the arrangement of the image input apparatus according to the embodiment of the invention.

FIG. 2 shows a driving mechanism for the optical unit 107 of the flat-bed type scanner 1 shown in FIGS. 1A and 1B. The optical unit 107 has a belt 3 on one side thereof. The belt 3 is hung on a driving roller 4 and a driven roller 5. The driven roller 5 rotates according to the rotation of the driving roller 4. To prevent skidding between the belt 3 and the driving roller 4, the inner side of the belt 3 is arranged to have a rugged surface which is arranged to be in mesh with a rugged surface provided on the driving roller 4. A motor 6 is arranged as a drive source for the driving roller 4 to move the optical unit 107 in the sub-scanning direction.

Figure 3:
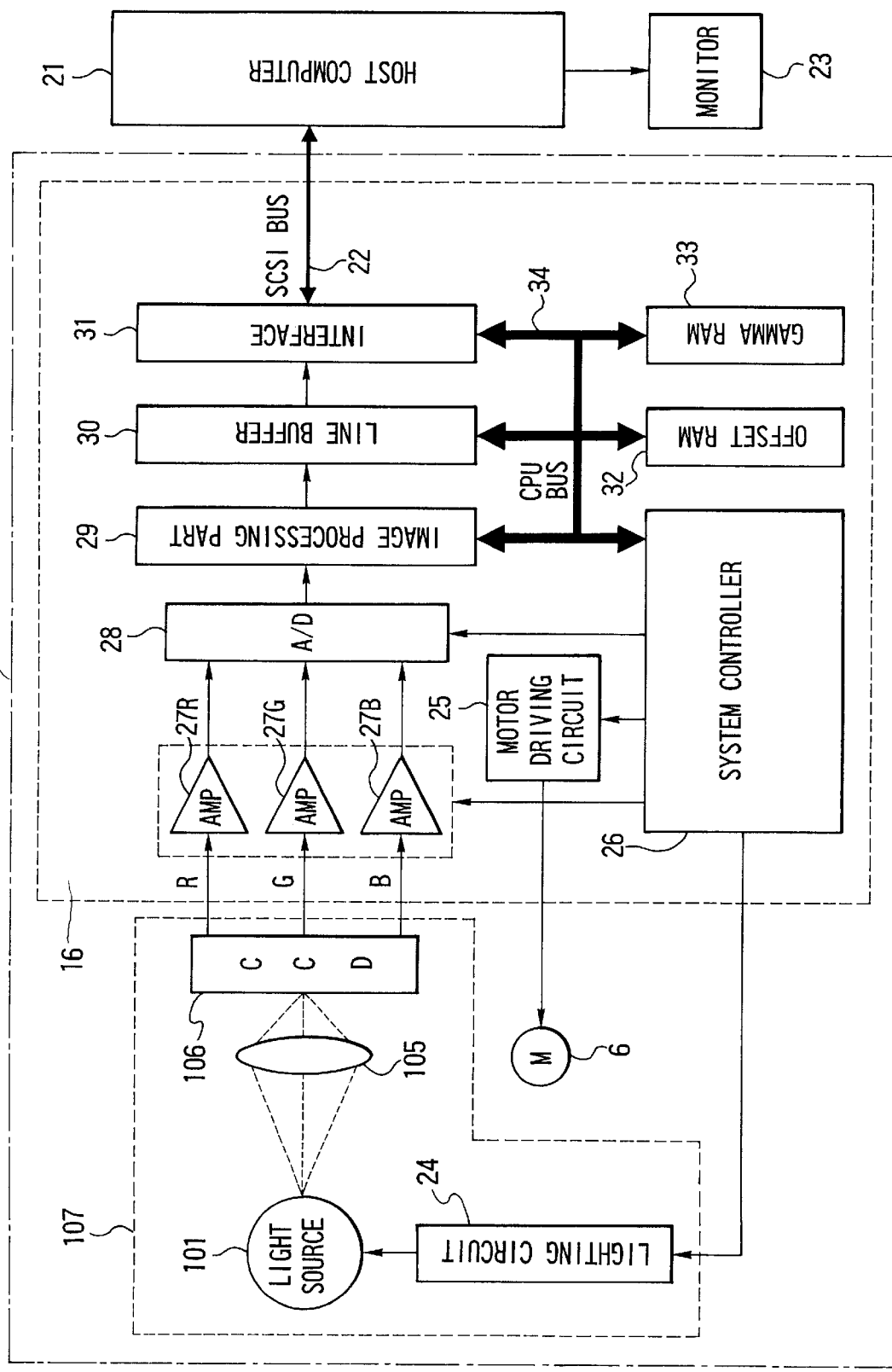
FIG. 3 is a block diagram showing the circuit arrangement of the image input apparatus according to the embodiment of the invention.

FIG. 3 is a block diagram showing the internal arrangement of the image input apparatus (scanner) shown in FIGS. 1A and 1B. Functional blocks shown in FIG. 3 are arranged as follows.

Referring to FIG. 3, the optical unit 107 has a light source lighting circuit 24 arranged to light up the light source 101. In a case where a cold cathode-ray tube is employed as the light source 101, for example, the light source lighting circuit 24 is arranged to be the so-called inverter circuit. An electric circuit board 16 includes a motor driving circuit 25 which is provided for the pulse motor 6. In accordance with a signal from a system controller 26 which is a system control means for the image scanner 1, the motor driving circuit 25 outputs an excitation change-over signal for change-over of an exciting action on the pulse motor 6. Analog gain adjusters 27R, 27G and 27B are arranged to variably amplify analog image signals outputted from the CCD 106.

An A/D converter 28 is arranged to convert analog image signals outputted from the variable analog gain adjusters 27R, 27G and 27B into a digital image signal. An image processing part 29 is arranged to perform an image processing action on the digital image signal, including offset correction, shading correction, digital gain adjustment, color balance adjustment, masking, conversion of resolution in the main scanning direction and the sub-scanning direction, etc. A line buffer 30 is arranged to temporarily store image data and is a general-purpose random access memory.

An interface part 31 is provided for communication with a host computer 21. In this case, an SCSI controller is employed as the interface part 21. However, a Centronics, USB or some other interface may be employed. An offset RAM 32 is arranged to be used as a working area for the image processing action. Since the CCD 106 has R, G and B line sensors arranged in parallel to each other with some predetermined offset, the offset RAM 32 is used for correcting the offset among the R, G and B lines. The offset RAM 32 is further arranged to temporarily store data of varied kinds such as data of shading correction, etc. In this case, a general-purpose random access memory is employed as the offset RAM 32.

A gamma RAM 33 is arranged to store data of gamma curves for gamma correction. The system controller 26 is arranged to store a sequence of processes of the whole image scanner 1 in the form of a program and to carry out control of varied kinds according to instructions of the host computer 21. A system bus 34 is arranged to interconnect one another the system controller 26, the image processing part 29, the line buffer 30, the interface part 31, the offset RAM 32 and the gamma RAM 33. The system bus 34 is composed of an address bus and a data bus.

Figure 4A:
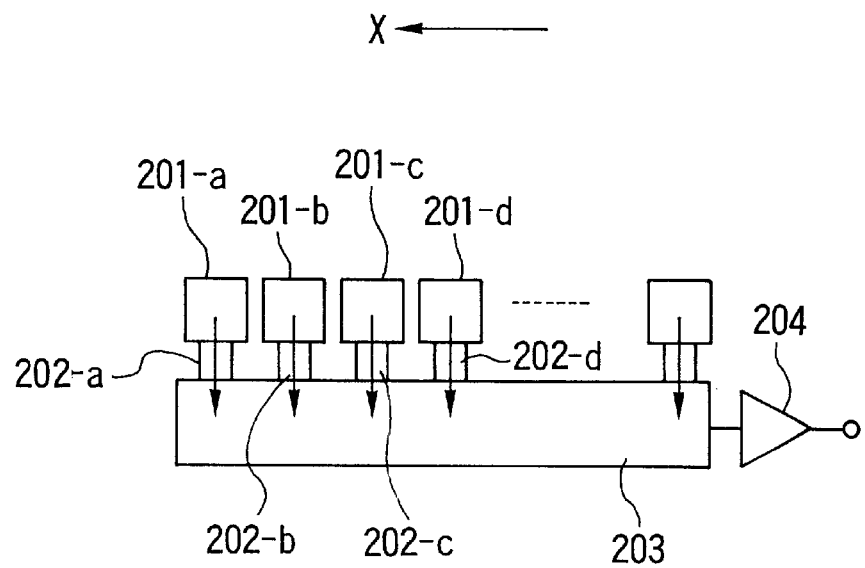
FIGS. 4A and 4B are diagrams showing the arrangement of a CCD linear image sensor in the image input apparatus according to the embodiment of the invention.
Figure 4B:
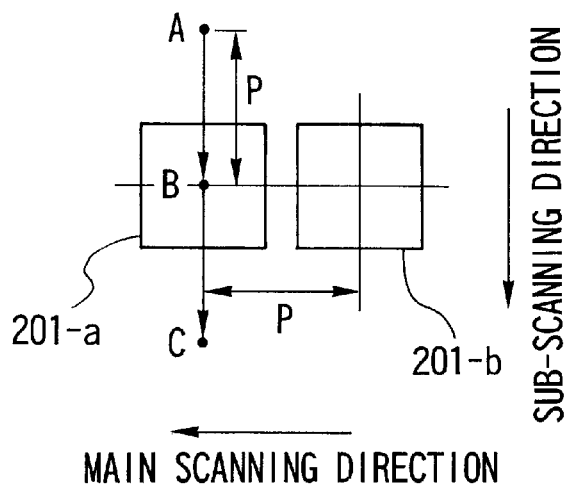

FIGS. 4A and 4B schematically show the arrangement of the CCD 106. Referring to FIG. 4A, photoelectric conversion pixels 201-$a$, 201-$b$, 201-$c$, 201-$d$, - - - are linearly aligned in a row at the same pitch. Sending gates 202-$a$, 202-$b$, 202-$c$, 202-$d$, - - - are arranged to send out electric charges photoelectrically converted by the photoelectric conversion pixels 201-$a$, 201-$b$, 201-$c$, 201-$d$, - - - - . A transfer part 203 is arranged to serially transfer the electric charges. An output circuit 204 is arranged to linearly read the transferred electric charges as an output signal. FIG. 4B is an enlarged view showing the photoelectric conversion pixels 201-$a$ and 201-$b$.

As mentioned above, the original D is arranged to be linearly illuminated in the main scanning direction. Then, optical images formed through an optical lens, etc., on the row of the photoelectric conversion pixels 201-$a$, 201-$b$, 201-$c$, 201-$d$, - - - move at a predetermined speed in the sub-scanning direction as shown in FIG. 4B. During a predetermined period for which the formed images move from a position A to another position B as shown in FIG. 4B, the electric charges photoelectrically converted and accumulated at the row of photoelectric conversion pixels 201-$a$, 201-$b$, 201-$c$, 201-$d$, - - - are sent to the transfer part 203. After that, the electric charges are read out from the output circuit 204 during a predetermined period for which the formed images move from the position B to another position C. A cyclic line-sequential signal, i.e., a main scanning line signal, is obtained with these processes repeated.

As shown in FIG. 4B, a distance AB (a distance BC) is generally set to be equal to the pitch P of the photoelectric conversion pixels in the main scanning direction to have equal resolutions in both the main scanning direction and the sub-scanning direction.

The image input apparatus arranged as described above operates as follows. With the original D placed on the original-placing glass board 100, when a command to start reading is received from the host computer 21, the motor 6 is driven to cause the belt 3 to begin revolving. The optical unit 107 then moves from a home position to the right as viewed in FIGS. 1A and 1B and FIG. 2. During the process of the movement of the optical unit 107, a prescribed width of the surface of the original D is continuously read while the light source 101 of the optical unit 107 illuminates the image-recorded surface of the original D. Reflected light from the original D reaches the CCD 106 through the mirrors 102, 103 and 104 and the lens 105. The CCD 106 photoelectrically converts the light from the lens 105 to output an image signal. The image signal is sent to the image processing part 29 disposed on the electric circuit board 16 and is then stored at a memory disposed within the image processing part 29. Upon arrival of the optical unit 107 at a reading end position, the system controller 26 causes the motor 6 to reversely rotate so as to return the optical unit 107. When the optical unit 107 has come back to a predetermined position, the system controller 26 causes the motor 6 to make normal rotation so as to start the second-time scanning. An image obtained by the second-time scanning is combined by the image processing part 29 with an image obtained by the first-time scanning. The image input apparatus is arranged not to remove the original D from the original-placing glass board 100 until completion of the second-time scanning.

Figure 5A:
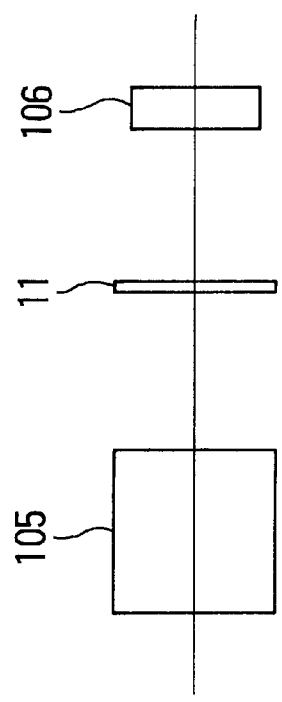
FIGS. 5A, 5B and 5C are schematic diagrams showing a part of the image input apparatus according to the embodiment of the invention as viewed from the side of an original-placing glass board thereof.
Figure 5C:
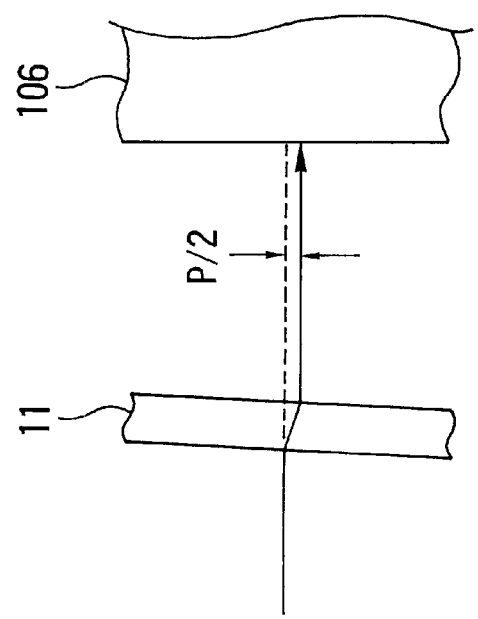
Figure 5B:
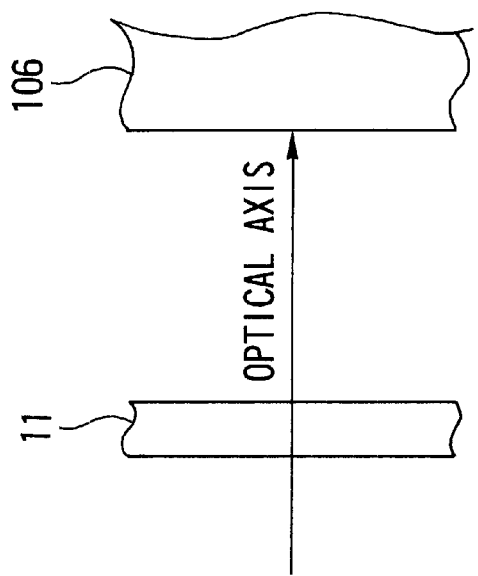

FIG. 5A shows the arrangement of the image input apparatus in part as viewed from the side of the original-placing glass board 100. FIGS. 5B and 5C are enlarged views further showing the part shown in FIG. 5A.

A glass plate 11 is interposed between the image forming lens 105 and the CCD 106. The glass plate 11 is arranged to have a variable slanting angle within a predetermined range with respect to an optical axis of the image forming lens 105.

In the arrangement described above, the second-time scanning is assumed to be made from the left to the right as viewed in FIGS. 1A and 1B. In making the first-time scanning, the glass plate 11 is held perpendicular to the optical axis, as shown in FIG. 5B. For the second-time scanning, the glass plate 11 is slanted a little as shown in FIG. 5C in such a way as to cause the optical axis to shift as much as ½ of the pixel pitch P. Therefore, the degree of slanting the glass plate 11 is decided from the thickness and the refractive index of the glass plate 11 to make the amount of shift of the optical axis become "P/2".

In the case of the present embodiment, the speed of scanning is controlled in such a way as to make a distance to which the optical unit 107 moves in the sub-scanning direction for every cycle period of a line-sequential signal at each scanning approximately equal to a pitch between pixels of the CCD 106. Then, the respective positions of optical images of line-sequential signals formed on the CCD 106 by the scanning performed two times are made to shift from each other to an extent which approximately corresponds to ½ of the pitch P between pixels of the CCD 106, i.e., the timing of reading the line-sequential signal for the first-time scanning is arranged to shift from the timing of reading the line-sequential signal for the second-time scanning by approximately ½ of the cycle period of the line-sequential signal.

Figure 6:
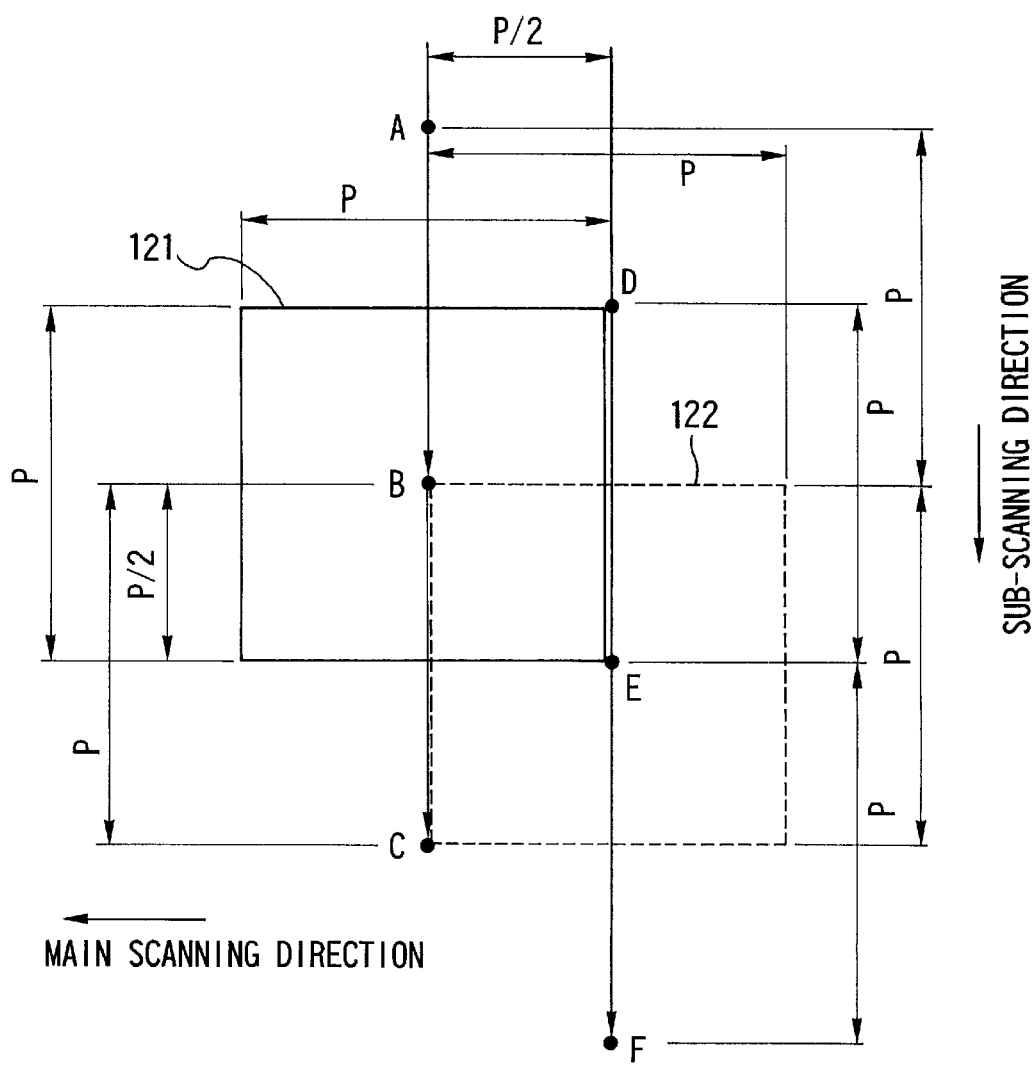
FIG. 6 is a diagram showing the relative positions of a pixel arrangement and an optical image in the image input apparatus according to the embodiment of the invention.

FIG. 6 shows the movement of an optical image formed on each of the photoelectric conversion pixels in relation to the position of the pixel. The position of the optical image obtained at the time of each scanning is considered to be not varying in the main scanning direction while the position of the pixel is considered to be varying in the main scanning direction. In FIG. 6, a full line 121 represents an x-th pixel position obtained, at the time of the first-time scanning, in the main scanning direction on a predetermined number-th main scanning line (assumed to be a y-th line) as counted from the end of a predetermined image reading range in the sub-scanning direction. A dotted-line 122 represents an x-th pixel position obtained, at the time of the second-time scanning, in the main scanning direction on the y-th line as counted from the end of the predetermined image reading range in the sub-scanning direction. The centers of these pixels shift from each other by P/2 both in the main scanning direction and the sub-scanning direction.

The pixel center position moves from a position A to a position B on the y-th line of the first-time scanning during the cycle period of the line-sequential signal, and moves from the position B to a position C on the y+1-th line of the first-time scanning. The pixel center position likewise moves from a position D to a position E on the y-th line of the second-time scanning, and moves from the position E to a position F on the y+1-th line of the second-time scanning. Distance of each movement is equal to the pitch P.

Accordingly, in the arrangement described above, the pixel data obtained by the first-time scanning and the pixel data obtained by the second-time scanning can be considered to be obtained by making spatial sampling at positions which differ by P/2 in both the main scanning direction and the sub-scanning direction.

FIG. 7 shows a method whereby new pixel data is formed from the pixel data obtained through scanning twice as described above in such a manner that the pixel data pitch of adjacent pixel data becomes ½ both in the main scanning direction and the sub-scanning direction. In FIG. 7, a full line represents the position of pixel data obtained by the first-time scanning. A dotted line represents the position of pixel data obtained by the second-time scanning. Reference symbol D1(x,y) denotes the x-th pixel data obtained on the y-th line during the first-time scanning. Reference symbol D2(x,y) denotes the x-th pixel data obtained on the y-th line during the second-time scanning.

Data obtained by adding and-averaging the pixel data D1(x,y) and the pixel data D2(x,y) is considered to be 2x-th pixel data of a new 2y-th line. Data obtained by adding and averaging the pixel data D1(x,y) and pixel data D2(x−1,y) is considered to be 2x−1-th pixel data of a new 2y-th line. Data obtained by adding and averaging the pixel data D1(x,y) and pixel data D2(x,y−1) is considered to be 2x-th pixel data of a new 2y−1-th line. Data obtained by adding and averaging the pixel data D1(x,y) and pixel data D2(x−1,y−1) is considered to be 2x−1-th pixel data of a new 2y−1-th line.

With the pixel data formed by carrying out the adding and averaging operation four times with respect to the pixel data D1(x,y) on all pixel data obtained by the first-time scanning in the above-stated manner, the data can be obtained in an amount four times as much as the data amount obtainable by one-time sub-scanning.

Figure 8:
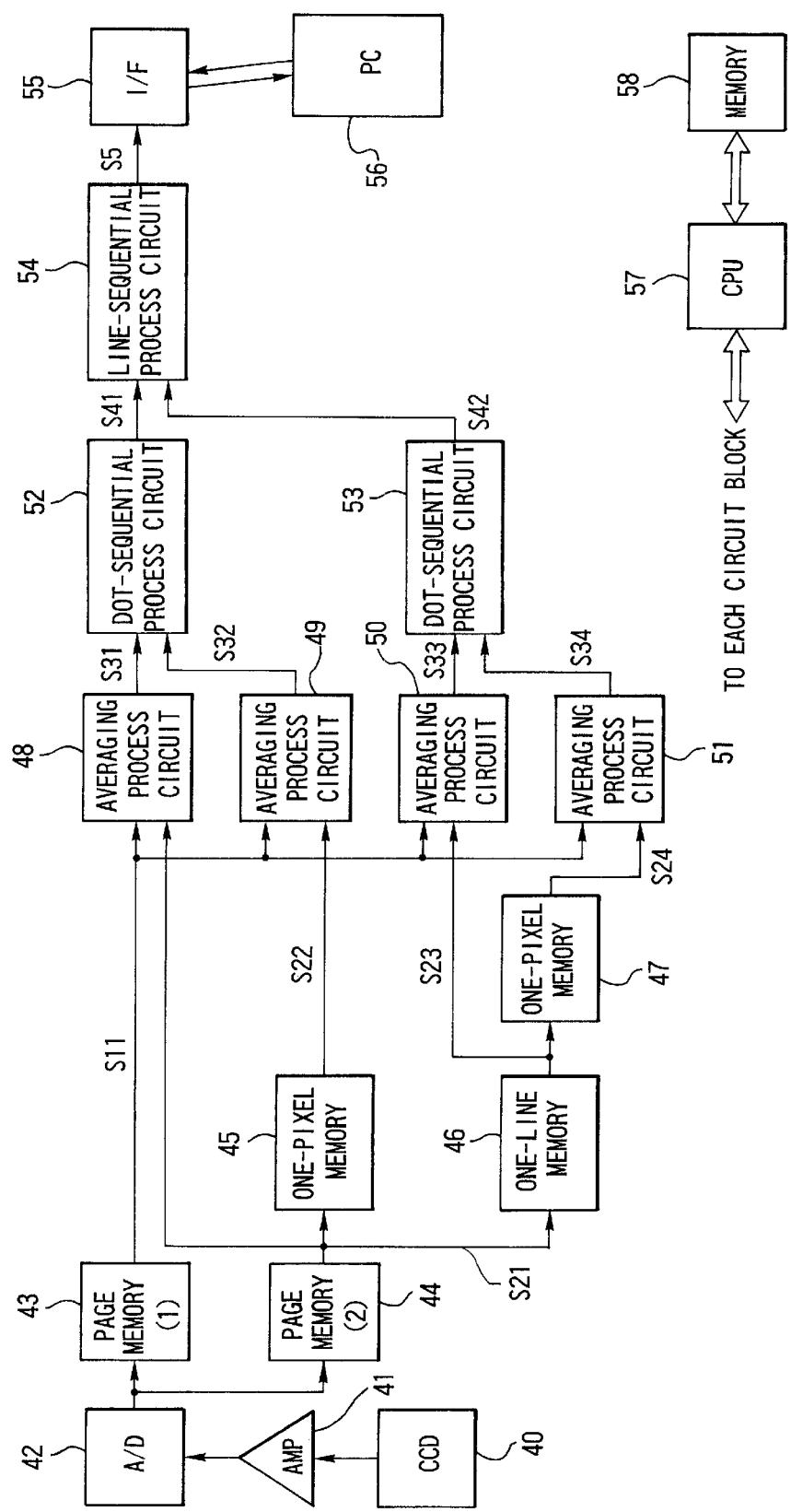
FIG. 8 is a circuit block diagram of the image input apparatus according to the embodiment of the invention.

FIG. 8 is a block diagram showing circuit blocks arranged to carry out the above-stated adding and averaging processes. Referring to FIG. 8, an image sensor 40 which is composed of a CCD or the like is arranged to be an image pickup means. In FIG. 8, there are illustrated a signal amplifier 41, an A/D converter 42, and page memories 43 and 44 which are arranged to be capable of storing image data obtained by scanning twice.

Each of memories 45 and 47 is capable of storing a one-pixel amount of data. A memory 46 is capable of storing a one-line amount of data. Each of averaging process circuits 48, 49, 50 and 51 is arranged to average data of two pixels. Each of dot-sequential process circuits 52 and 53 is arranged to perform a dot-sequential process on data of two pixels. A line-sequential process circuit 54 is arranged to perform a line-sequential process on pixel data trains of two lines.

An interface (IF) circuit 55 is provided for communication with a PC (personal computer) 56. A CPU 57 is arranged to control the sequence of processes performed by the circuit blocks described above.

Figure 9:
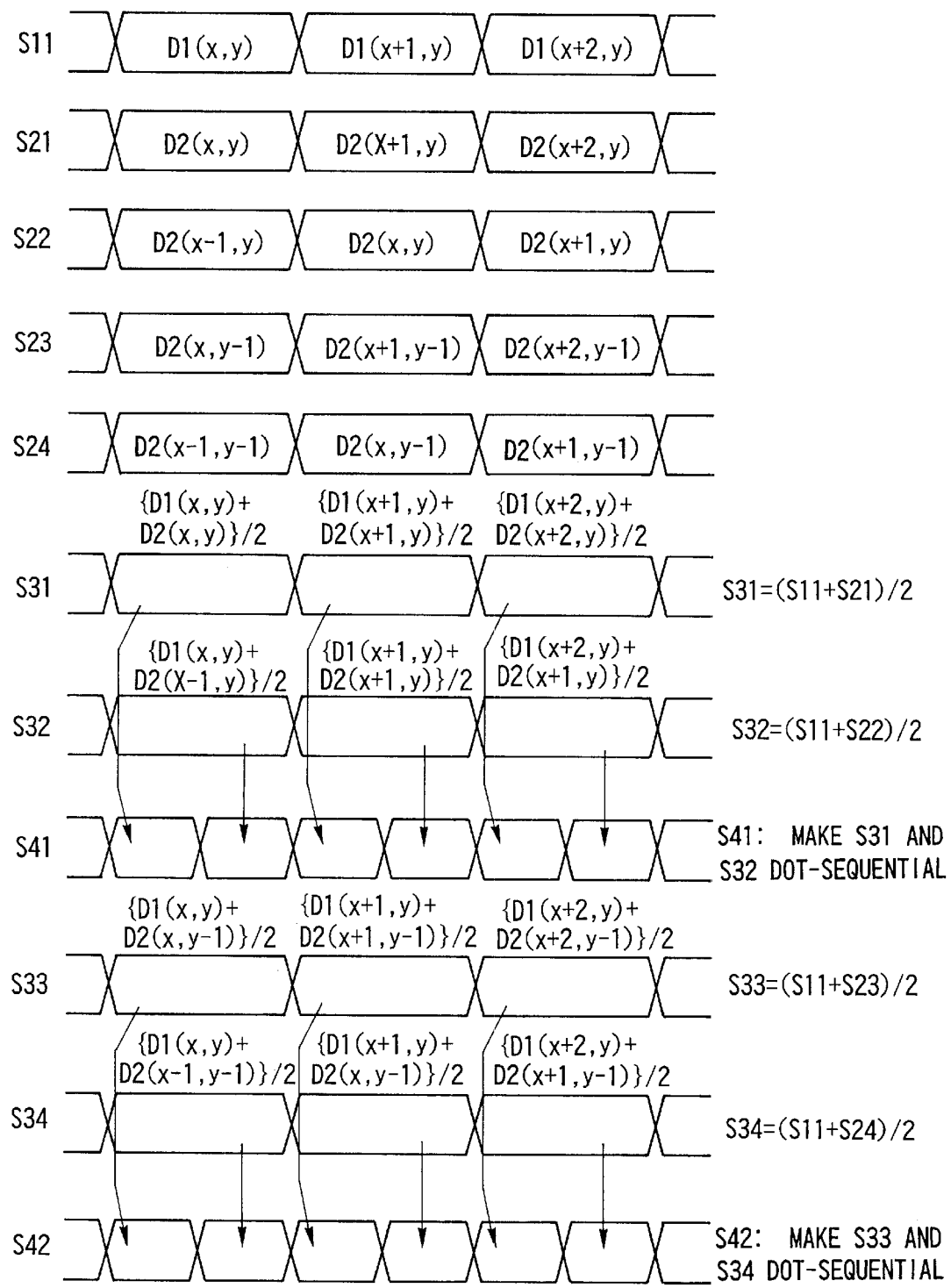
FIG. 9 is a signal waveform chart showing signals of various parts shown in the circuit block diagram of FIG. 8.

FIG. 9 is a signal waveform chart showing only data of one gradation of a pixel data train outputted from each of the circuit blocks shown in FIG. 8. The actions of circuit blocks arranged as shown in FIG. 8 are described in detail as follows.

Referring to FIG. 9, pixel data trains S11 and S21 are outputted respectively from the page memories 43 and 44. A pixel data train S22 is obtained by delaying the pixel data train S21 by a one-pixel amount through the one-pixel memory 45. A pixel data train S23 is obtained by delaying the pixel data train S21 by a one-line amount through the one-line memory 46.

A data train S24 is obtained by further delaying the data train S23 by a one-pixel amount through the one-pixel memory 47.

To obtain average values corresponding to those shown in FIG. 8, an average value S31 is first computed from the two pixel data trains S11 and S21 by the averaging process circuit 48. The averaging process circuit 49 likewise computes another average value S32 from the two pixel data trains S11 and S22.

Next, an average value S33 is computed from the two pixel data trains S11 and S23 by the averaging process circuit 50. An average value S34 is computed from the two pixel data trains S11 and S24 by the averaging process circuit 51.

Then, the dot-sequential process circuit 52 forms a pixel data train S41 by alternately aligning the, two pixel data trains S31 and S32 in a cycle of ½ of the data period. The dot-sequential process circuit 42 forms a pixel data train S42 by alternately aligning the two pixel data trains S33 and S34 in the cycle of ½ of the data period.

The line-sequential process circuit 54 then alternately outputs the pixel data trains S41 and S42 for every one line. As a result, a pixel data train S5 which has a twice large data amount in both the main scanning direction and the sub-scanning direction is obtained.

In the present embodiment described above, the image data storing memories are disposed on the side of the image input apparatus. However, the functions of the memories may be arranged to be carried out by some memory or the like disposed within the PC 56. Such a change is practically advantageous in terms of reduction in cost. In the case of such a change, the writing and reading into and from the storage and the dot-sequential process are controlled on the side of the PC 56 according to an application software arrangement.

With two pixel data averaged by the averaging process of the present embodiment as described above, a sensitivity distribution is obtained as described below.

Figure 10:
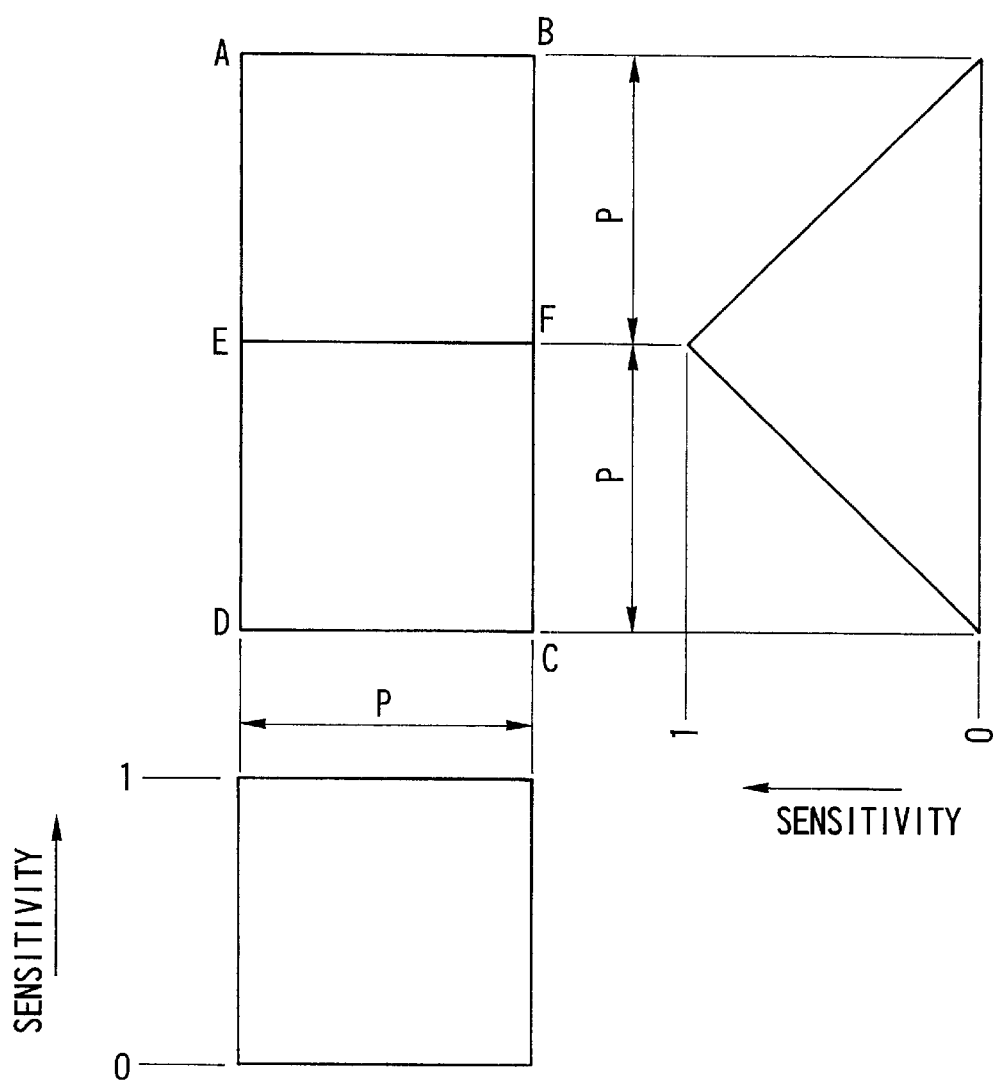
FIG. 10 is a diagram showing a sensitivity distribution of one-pixel data shown in FIG. 7.

Each of the photoelectric conversion pixels of the CCD 106 is assumed to be a square pixel having an aperture opened 100 percent. Instead of moving the optical image to an extent approximately corresponding to the pixel pitch P in the sub-scanning direction at every cycle period of the main scanning line, it is assumed that the photoelectric conversion pixel itself moves to the extent approximately corresponding to the pixel pitch P in the direction opposite to the sub-scanning direction. Then, the sensitivity distribution of one pixel data D1(x,y) can be expressed in a three-dimensional manner as shown in FIG. 10. Referring to FIG. 10, the sensitivity distribution becomes a trihedral shape having a square bottom ABCD and an apex side EF. The volume of the trihedral shape is "$p^2$". The sensitivity at the apex side EF is at a maximum value "1".

Figure 11:
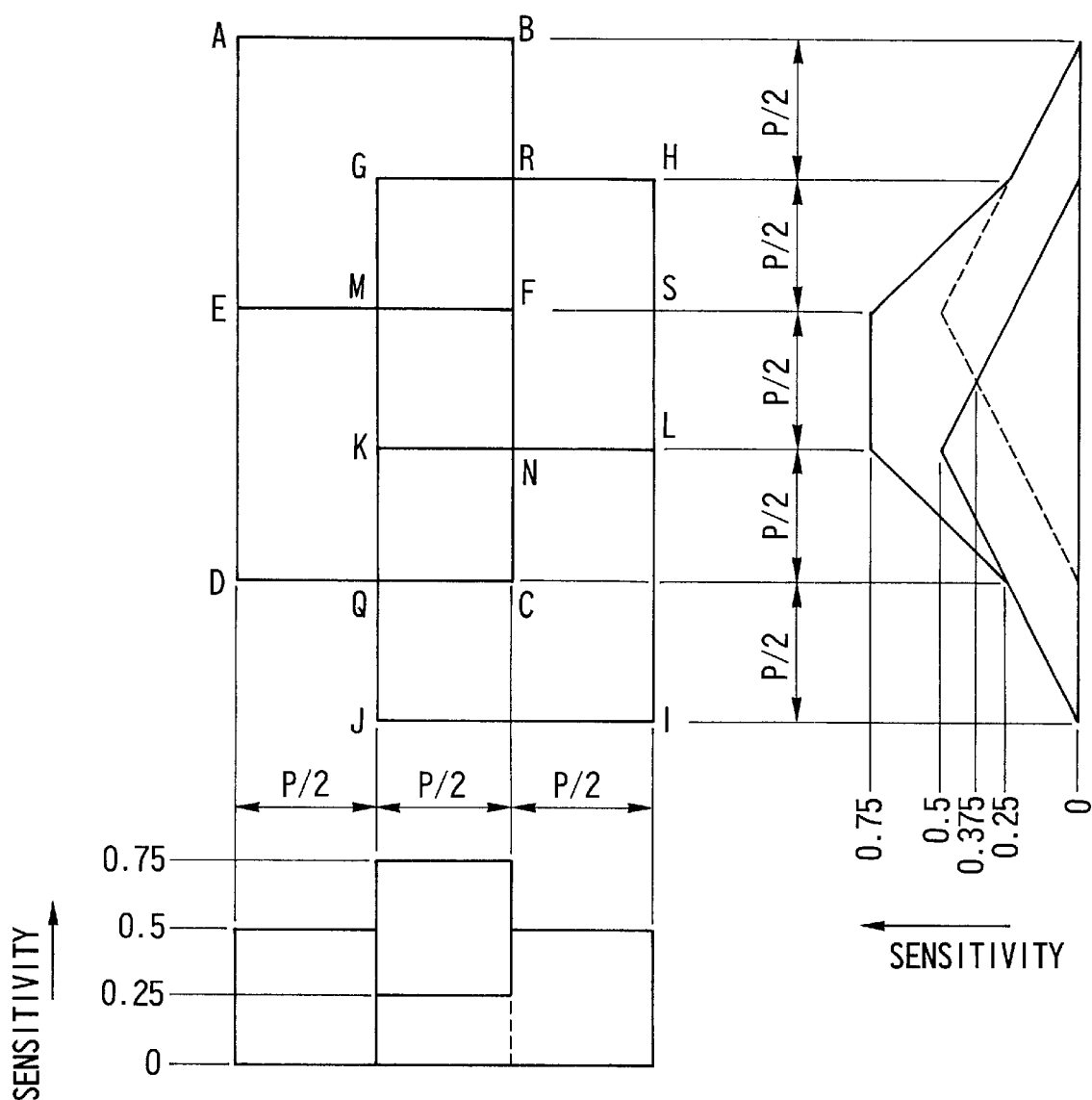
FIG. 11 is a diagram showing a sensitivity distribution of two-pixel data shown in FIG. 7 obtained through an adding-and-averaging process.

Next, the sensitivity distributions of the two pixel data D1(x,y) and D2(x,y) which are obliquely opposed to each other as shown in FIG. 7 can be shown in a superposed three-dimensional manner as shown in FIG. 11. Referring to FIG. 11, the sensitivity distribution of the pixel data D1(x,y) is expressed, like in FIG. 10, in a trihedral shape having a square bottom ABCD and an apex side EF, and the sensitivity distribution of the pixel data D2(x,y) is expressed in another trihedral shape having a square bottom GHIJ and an apex side KL. Then, the two trihedral shapes are superposed on each other as shown in FIG. 11. In the thus-obtained composite sensitivity distribution shown in FIG. 11, a maximum sensitivity "0.75" is obtained in a square shape MFNK. The center of the square MFNK is the barycenter of sensitivity. In the distribution, the sensitivity gradually lowers from the sensitivity barycenter in the sub-scanning direction. The sensitivity in the main scanning direction becomes "0.375".

As apparent from comparison between FIG. 10 and FIG. 11, in the sensitivity distribution obtained by averaging the two pixel data, the area of distribution somewhat widens both in the main scanning direction and the sub-scanning direction. However, since the ratio of the sensitivity within the square MFNK which includes the sensitivity barycenter to the whole sensitivity distribution is high, the efficiency of the MTF (modulation transfer function) does not much decrease.

The sensitivity distributions of new pixel data obtained by the adding-and-averaging process from the two pixel data D1(x,y) and D2(x-1,y), the two pixel data D1(x,y) and D2(x,y-1) and the two pixel data D1(x,y) and D2(x-1,y-1) which are shown in FIG. 7 were also examined in the same manner as described above. The results of examination indicate that the sensitivity distributions have their barycenters located respectively at the centers of the squares KNCQ, RHSF and GRFM, as shown in FIG. 11. Therefore, the present embodiment is capable of reading density varying patterns on the original in such a way as to have the distances P/2 in the main scanning direction and the sub-scanning direction made to be ½ of the cycle period.

As mentioned above, according to the arrangement of the present embodiment, the efficiency of the MTF never saliently lowers or deteriorates from what is shown in FIG. 10. Any minor deterioration with respect to the MTF can be corrected by using a digital filter for both the main scanning and the sub-scanning. For example, a matrix filter is formed, as shown in FIG. 8, in such a way as to have "⅘" as a coefficient to be applied to an object pixel which is obtained by averaging two image data and to have "−⅕" as a coefficient to be applied to two pixels aligned, with the object pixel between them, in each of the main scanning direction and the sub-scanning direction. Such a matrix filter is capable of having at "1" the sensitivity of the square MFNK which includes the sensitivity barycenter position as shown in FIG. 11, so that the efficiency of the MTF can be sufficiently enhanced.

Compared with image data obtained by performing sub-scanning only once, the arrangement described above enables the image input apparatus to obtain a much more finely defined image by increasing the number of spatial sampling points by two times both in the main scanning direction and the sub-scanning direction.

In the case of the present embodiment, the first-time sub-scanning and the second-time sub-scanning are arranged to be performed in one and the same direction. However the second-time sub-scanning may be made in the direction opposite to the first-time scanning direction. In other words, the second-time scanning may be performed from the opposite end of the original, instead of starting from the initial start position by coming back there after completion of the first-time sub-scanning. In the case of this modification, the image data obtained by the second-time scanning and stored is read out from the page memory 44 in a backward direction with respect to the sub-scanning direction.

Assuming that the total number of scanning lines of a predetermined image reading range is z, the image data obtained by the second-time scanning from the same position as the image data D(x,y) obtained by the first-time scanning can be expressed as D(x, z-y+1). Then, with the averaging process and the dot-sequential and line-sequential processes carried out in the same manner as described above, a very fine image can be obtained.

As mentioned above, the whole reading time can be shortened by reversing the sub-scanning direction of the second-time sub-scanning with respect to the first-time sub-scanning, as compared with the case where both the first-time scanning and the second-time scanning are arranged to be made in one and the same direction.

In the case of the present embodiment, as shown in FIG. 5A, the glass plate 11 is inserted between the image forming lens 105 and the CCD 106 as a means for shifting the pixels in the main scanning direction. However, the inserting position of the glass plate 11 may be change to any position between the original D and the CCD 106 so long as the inclination of the glass plate 11 is determined according to the thickness and the refractive index of the glass plate 11.

The method for shifting the pixels in the main scanning direction may be changed to a method of shifting the CCD 106 as much as a necessary amount in the main scanning direction or to shift the original-placing glass board 100 or the original D shown in FIGS. 1A and 1B as much as a necessary amount in the main scanning direction. Such modification can be made by a simple arrangement.

Further, while the invention is applied to an image input apparatus using a CCD linear image sensor. The invention is applicable also to an image input apparatus using a contact linear type image sensor. In such a case, the method for shifting pixels in the main scanning direction may be changed to a method of shifting the contact linear type image sensor, the original-placing glass board or the original as much as a necessary amount in the main scanning direction.

Further, while the present embodiment of the invention has been described as a flat-bed type image input apparatus having an original-placing glass board, the invention is applicable also to the so-called sheet-feed type image input apparatus which is arranged to move and scan the original itself in the sub-scanning direction. In that case, a method for shifting a contact linear type image sensor or the original in the main scanning direction as much as a necessary amount can be used for shifting pixels in the main scanning direction.

Figure 12:
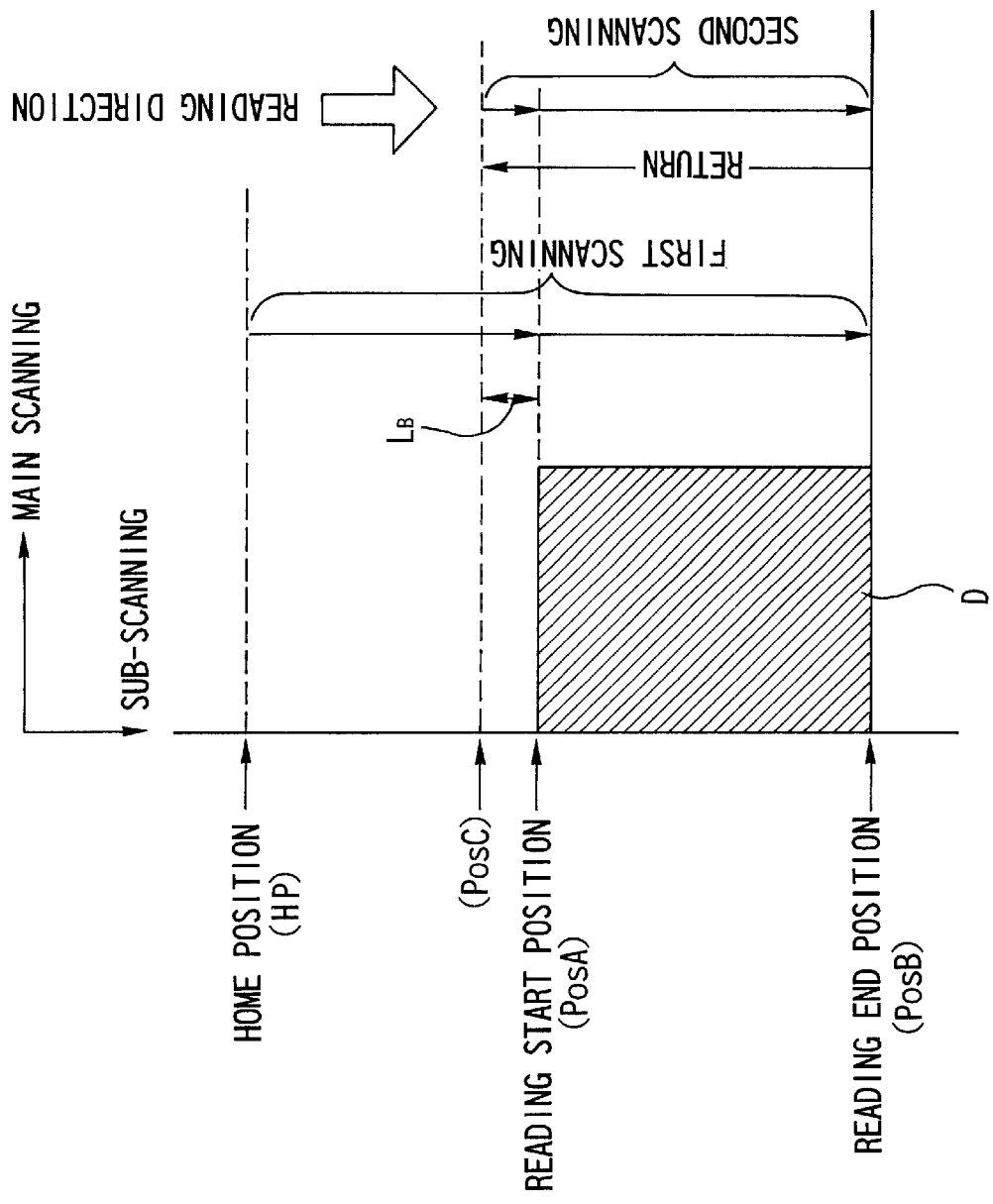
FIG. 12 is a diagram showing the principle of positioning control over the optical unit in the image input apparatus according to the embodiment of the invention.
Figure 13:
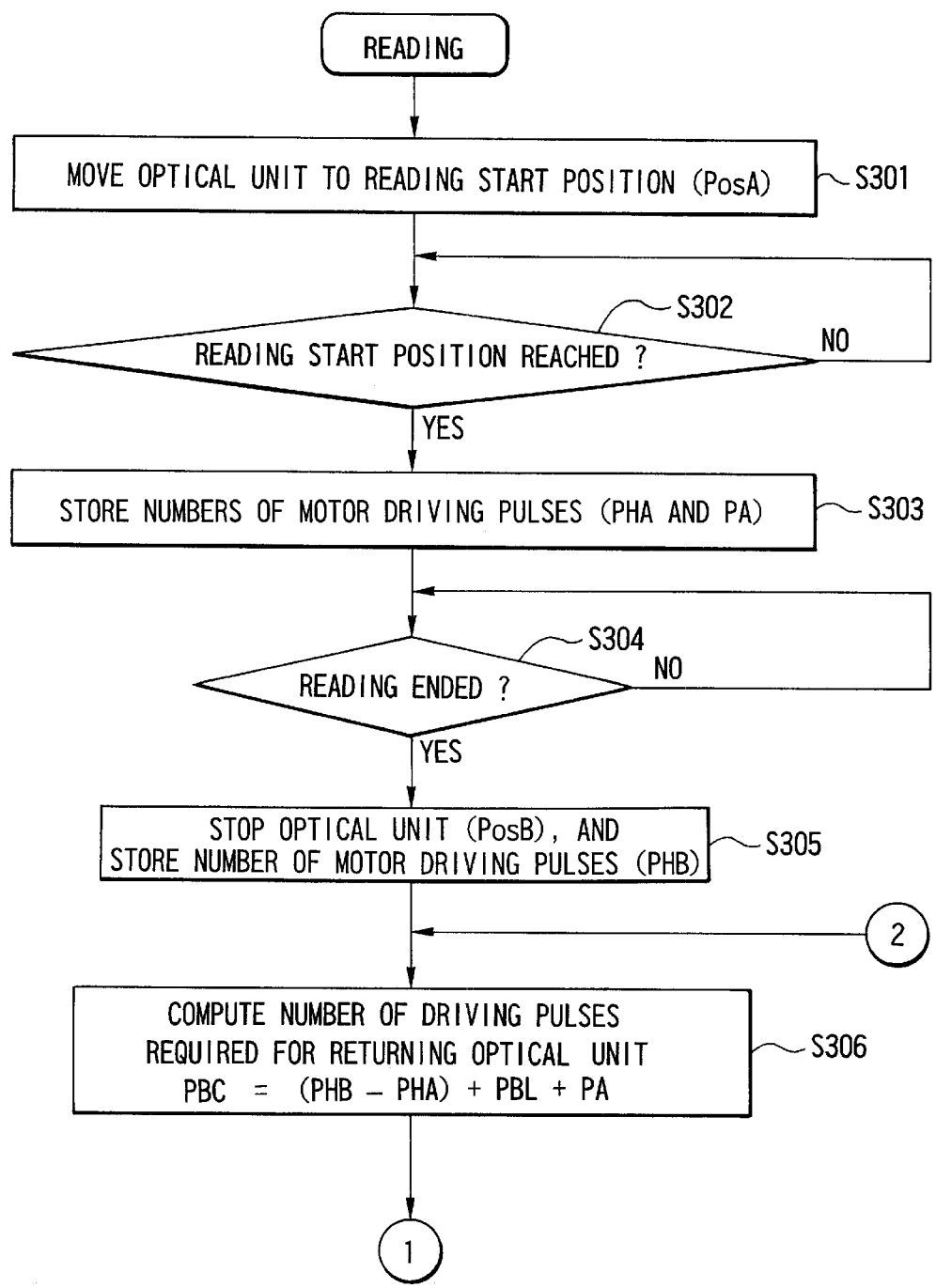
FIG. 13 is a flow chart showing a reading process in the image input apparatus according to the embodiment of the invention.
Figure 14:
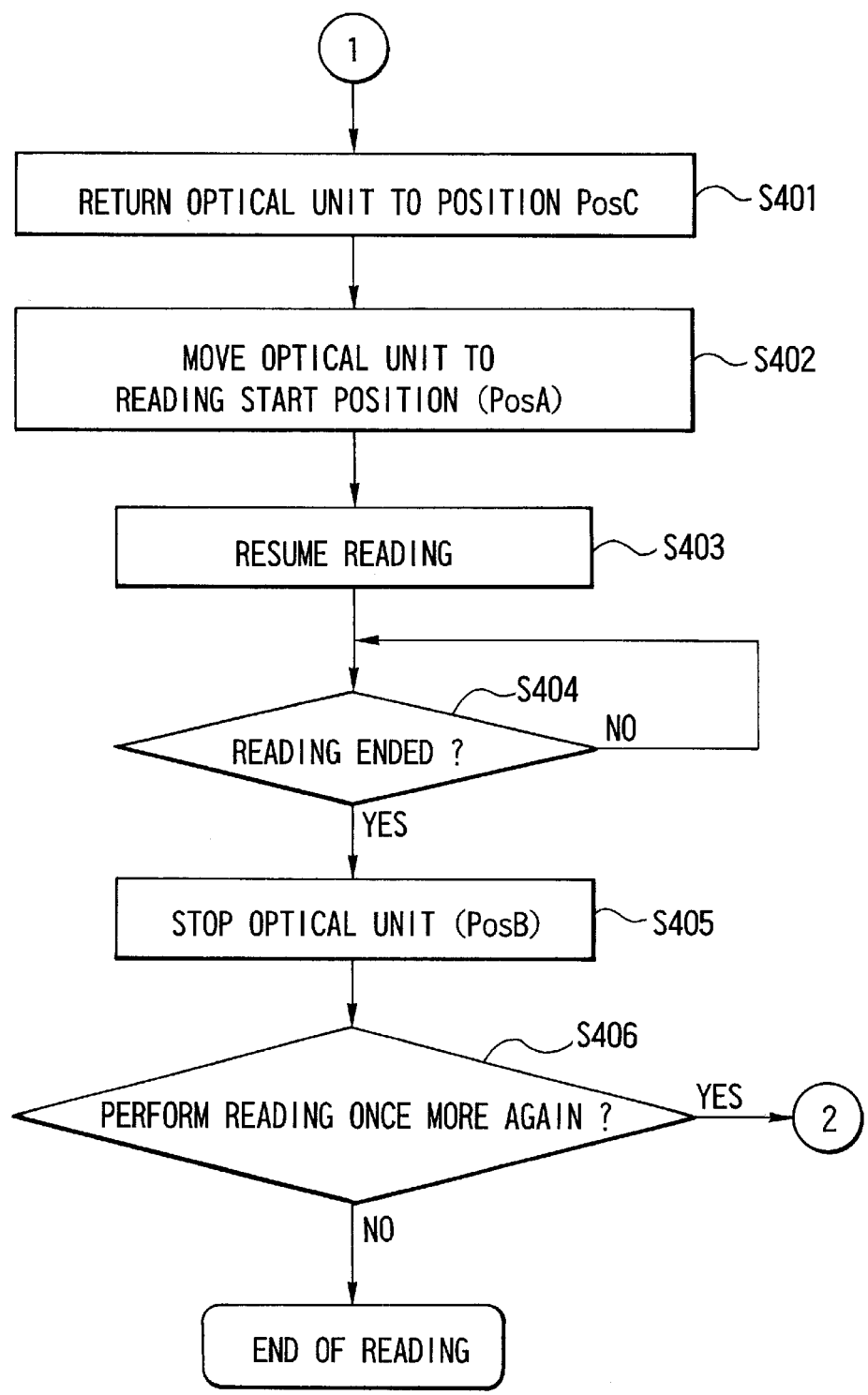
FIG. 14 is a flow chart showing the flow of reading process continuing from FIG. 13.

FIG. 12 shows the operating principle of positioning control over the optical unit 107 in the present embodiment of the invention. FIGS. 13 and 14 are flow charts showing the processes of the positioning control. A method for obtaining a composite image by causing the optical unit 107 to reciprocate twice for reading the image of one sheet of original is described below with reference to FIGS. 12, 13 and 14. The processes shown in FIGS. 13 and 14 are executed in accordance with a sequence of processes stored at a ROM disposed within the system controller 26. Incidentally, reference characters each having a prefix "S" in FIGS. 13 and 14 represent step numbers.

The CCD 106 is arranged to operate according to a reading synchronizing signal Hsync which is outputted at every electric charge accumulating time T (msec) of a clock signal which is sent from the system controller 26 at intervals of a predetermined period. The pulse motor 6 is arranged to act according to a pulse motor driving signal SPM outputted from the motor driving circuit 25 in synchronism with the synchronizing signal Hsync. In the case of the present embodiment, the pulse motor 6 moves the optical unit 107 to an extent corresponding to one line, upon receipt of four pulses.

The optical unit 107 usually stays at a home position (origin) HP set in the neighborhood of a reading start position PosA where reading the original D begins. After the original D is set under this condition, when a reading start button (not shown) provided in the scanner is pushed, or when a reading start command signal is sent from the host computer 21 by operating a mouse or a keyboard, the system controller 26 sends the reading synchronizing signal Hsync to the motor driving circuit 25 to cause the motor driving pulse signal SPM to be applied to the pulse motor 6 in synchronism with the synchronizing signal Hsync. Then, the pulse motor 6 rotates to cause the optical unit 107 to begin to move from the home position HP at a step S301 shown in FIG. 13. At the step S301, the optical unit 107 thus comes to a point right below the reading start position PosA which is at the fore end of the original D.

At a step S302, a check is made for the arrival of the optical unit 107 at the point right below the reading start position PosA. When the optical unit 107 is found to have reached the point right below the reading start position PosA, the flow of operation proceeds to a step S303. At the step S303, the system controller 26 stores a value PHA of the number of pulses of the motor driving pulse signal SPM supplied to the pulse motor 6 after the commencement of movement of the optical unit 107, with the first synchronizing signal Hsync sent out at the home position HP, until arrival of the optical unit 107 at the reading start position PosA. Further, a value PA of the number of pulses of the motor driving pulse signal SPM supplied to the pulse motor 6 after the synchronizing signal Hsync is sent out immediately before arrival at the reading start position PosA until the arrival at the reading start position PosA is also stored by the system controller 26.

Reading the original D progresses accordingly as the optical unit 107 moves further. In response to a request from the host computer 21 for data output, the system controller 26 sends image data to the host computer 21. At a step S304, a check is made to find if the process of reading has come to an end, i.e., if the optical unit 107 has reached the end of the original D. If so, the flow of operation proceeds to a step S305. At the step S305, the system controller 26 stops the supply of pulses from the motor driving circuit 25 to the pulse motor 6. This causes the optical unit 107 to come to a stop at a reading end position PosB. Then, the system controller 26 stores a value PHB of the number of pulses of the motor driving pulse signal SPM supplied to the pulse motor 6 during the period for which the optical unit 107 moves from the home position HP to the reading end position PosB. The system controller 26 processes, as image data of the original D, the image data read during a period after the synchronizing signal Hsync is sent out immediately before arrival at the reading start position PosA until the synchronizing signal Hsync is sent out immediately before the arrival at the reading end position PosB.

At a step S306, the system controller 26 computes the number of pulses of the driving pulse signal SPM required to be sent to the pulse motor 6 for moving back the optical unit 107 to a position PosC for the second-time reading. The number of pulses PBC of the driving pulse signal SPM required be supplied to the pulse motor 6 for moving the optical unit 107 from the reading end position PosB to the position PosC becomes a value obtained by adding the number of pulses PBL which corresponds to the backlash of the optical unit 107 to the number of pulses PAB required for moving the optical unit 107 from the reading start position PosA to the reading end position PosB. This number of pulses PBC is expressed by the following formula:

$$PBC=PAB+PBL=(PHB-PHA)+PBL \quad (1)$$

Where PBL=n×PH, and PH is the number of pulses of the driving pulse signal SPM applied during the period of one synchronizing signal Hsync, and a measured value of PH is stored beforehand at a memory arranged within the system controller 26.

In other words, the pulse motor 6 is supplied with a number of pulses of the driving pulse signal SPM obtained by adding the number of pulses PBL of the driving pulse signal SPM corresponding to the backlash of the optical unit 107 to the number of pulses PAB of the driving pulse signal SPM required for moving the optical unit 107 from the position PosB to the position PosA. The timing of arrival at the position PosA, however, differs from the timing of outputting of the synchronizing signal Hsync. Therefore, when taking into consideration the number of pulses PA of the driving pulse signal SPM supplied between the timing of arrival at the position PosA and the timing of outputting of the synchronizing signal Hsync, the number of pulses PBC to be supplied to the pulse motor 6 eventually becomes as expressed below:

$$PBC=(PHB-PHA)+PBL+PA \quad (2)$$

At a step S401 of FIG. 14, the system controller 26 causes the optical unit 107 to return to the position PosC shown in FIG. 12 in accordance with Formula (2). After that, the flow of operation proceeds from the step S401 to a step S402. At the step S402, since the backlash of the optical unit 107 must be taken into consideration also in moving the optical unit 107 forward, the driving pulse signal SPM of a number of pulses "PBL+PA" is supplied to the pulse motor 6 to cause the pulse motor 6 to rotate forward. By the forward rotation of the pulse motor 6, the optical unit 107 is moved in the sub-scanning direction, so that the optical unit 107 reaches the reading start position PosA. At a step S403, the optical unit 107 starts moving to perform the second-time reading. At a step S404, a check is made to find if the optical unit 107 has reached the reading end position PosB. If so, the flow proceeds to a step S405. At the step S405, the pulse motor 6 is controlled through the motor driving circuit 25 to stop the optical unit 107 from moving. At a step S406, a check is made to find if the next reading is to be performed. If so, the flow returns to the step S306 of FIG. 13 to repeat the step S306 and the steps subsequent thereto. If the next reading is found not necessary at the step S406, the flow of operation is terminated.

The present embodiment is arranged, as described above, to synchronize image reading with the motor driving pulse signal SPM for the pulse motor 6 by the image reading synchronizing signal Hsync from the system controller 26. In performing the first-time reading, the number of pulses PHA supplied to the pulse motor 6 during a period from outputting of the image reading synchronizing signal Hsync at the home position HP until the arrival of the optical unit 107 at the reading start position PosA and the number of pulses PA supplied to the pulse motor 6 during a period from a time point when the synchronizing signal Hsync is outputted immediately before the arrival at the reading start position PosA until the arrival at the reading start position PosA are stored. Then, the amount of returning the optical unit 107 is controlled by further taking into consideration the backlash of the optical unit 107. This control arrangement enables the optical unit 107 to start the second-time reading accurately from the start position of the first-time reading. By virtue of this control arrangement, the reading start position can be kept unvarying when scanning is repeated in the sub-scanning direction. The repeatability of scanning thus can be enhanced.

Second Embodiment

The first embodiment of the invention described above is arranged to obtain a high resolution image by slightly shifting the reading position of the second-time scanning in the main scanning direction from that of the first-time scanning. In the case of a second embodiment of the invention, the second-time scanning is performed without shifting the reading position from that of the first-time scanning and images are obtained with a high S/N ratio by averaging the image data obtained at one and the same reading position by the first-time scanning and the second-time scanning. Further, in the case of the second embodiment, the number of times of scanning is not Or limited to twice but may be increased to an N number of times. In that instance, the process of averaging is performed on image data obtained at one and the same position by the N-times scanning.

Third Embodiment

Figure 15:
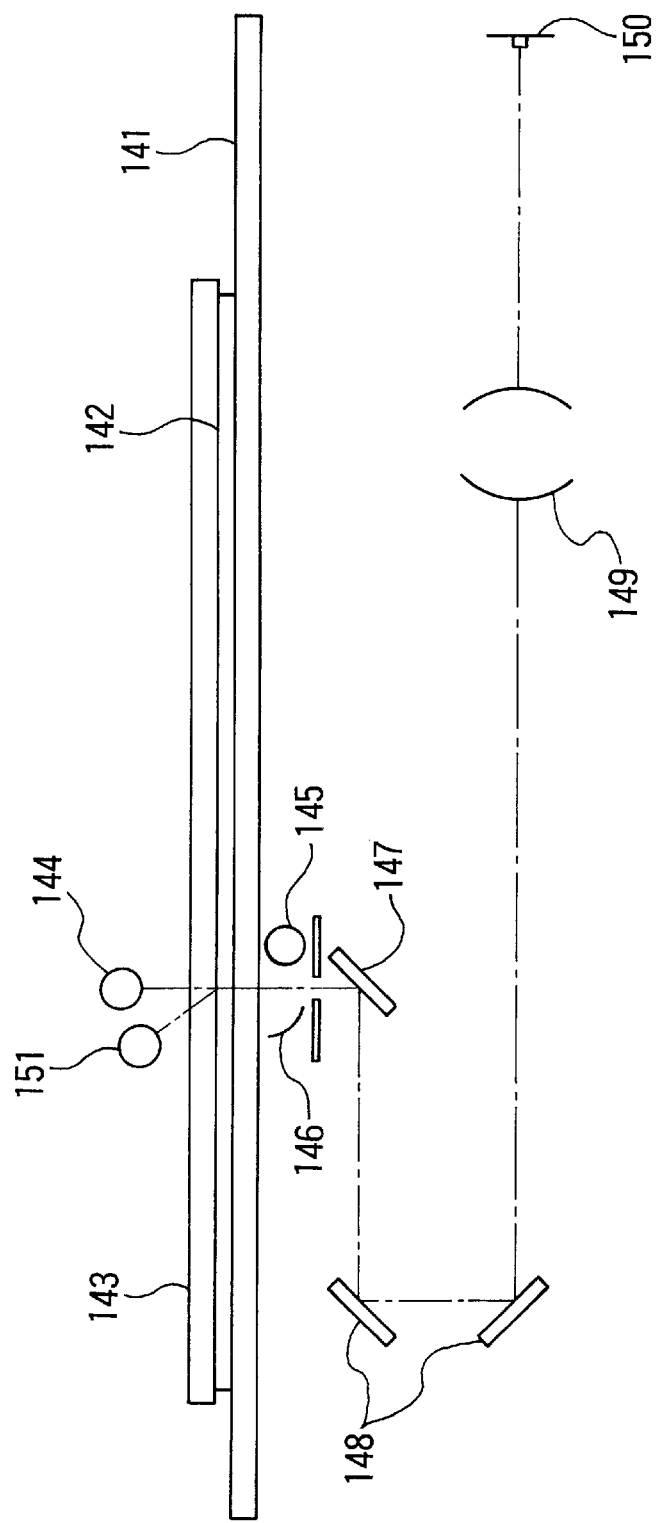
FIG. 15 is a schematic diagram showing the arrangement of an image input apparatus according to another embodiment of the invention.

A third embodiment of the invention is applied to an image input apparatus adapted for light-transmissive originals. FIG. 15 shows in outline the arrangement of the image input apparatus, which has a function of detecting smuts and flaws on the transmissive originals. Referring to FIG. 15, a positive or negative transmissive original 142 is placed on an original-placing glass board 141. A transmissive-original illuminating lamp 144 is arranged to illuminate the transmissive original 142 through a diffusing plate 143 which is disposed above the transmissive original 142. Transmission light from the transmissive original 142 is sent to a CCD 150 through a mirror 147, an obliquely-set pair of mirrors 148 and an image forming lens 149. The CCD 150, which is composed of a line-like array of many solid-state image sensors, converts the transmission light into an electrical signal to form an image in the main scanning direction. An infrared light lamp 151 is composed of an LED which has the peak of light emission intensity approximately at the wavelength of 880 nm.

In the case of the third embodiment, an image in the sub-scanning direction is formed by mechanically moving the transmissive-original illuminating lamp 144 and the mirror 147 at the same speed and the same phase with respect to the transmissive original 142 in the sub-scanning direction, and the pair of mirrors 148 are caused to follow the lamp 144 and the mirror 147 at a speed which is one half of the scanning speed in the same direction. Thus, while an optical path length from the original 142 to the CCD 150 (a conjugate relation) is kept unvarying, a two-dimensional image is formed jointly by the main scanning and the sub-scanning.

Figure 16:
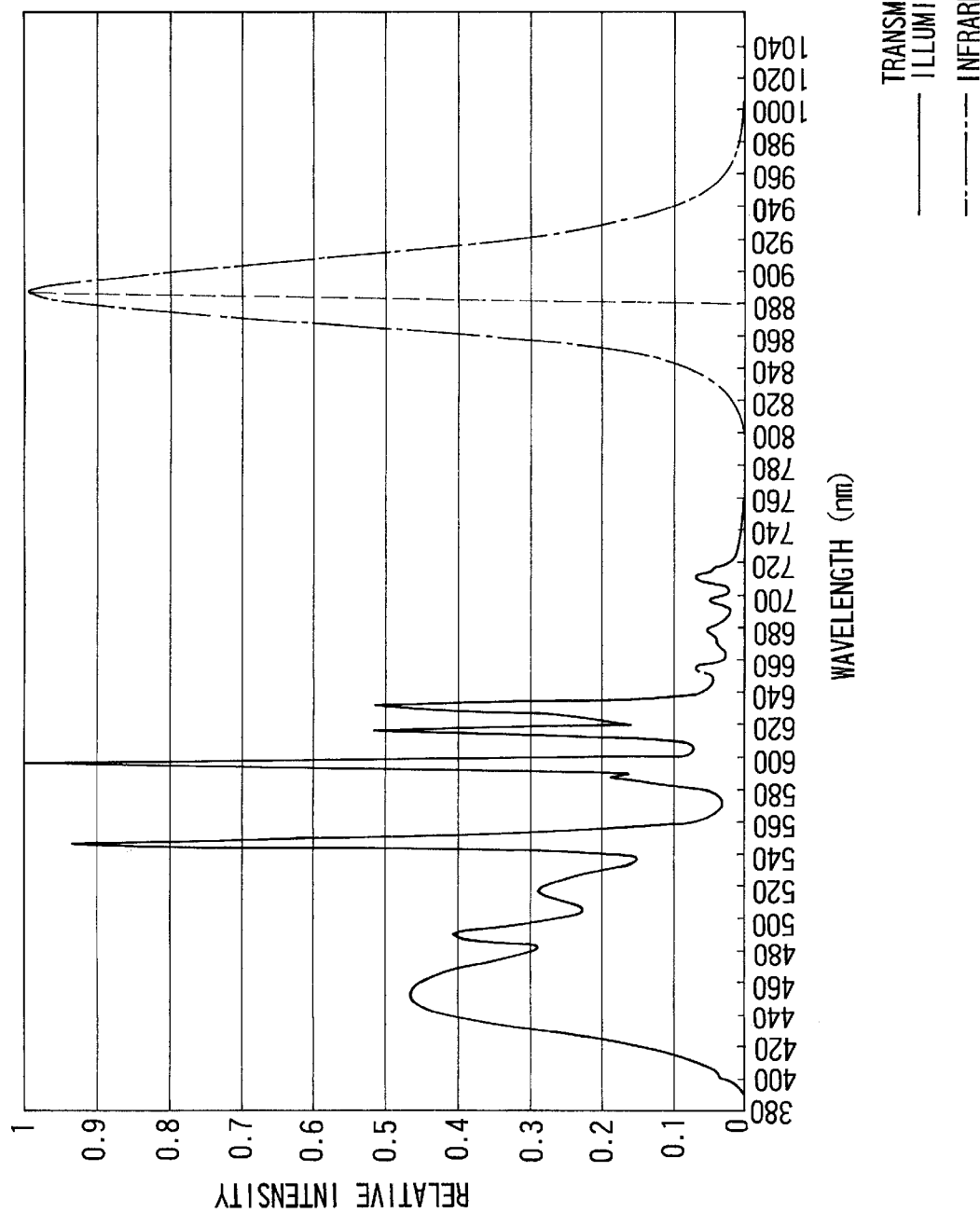
FIG. 16 is a graph showing a spectral sensitivity distribution of a transmissive-original illuminating lamp and that of an infrared light lamp.
Figure 17:
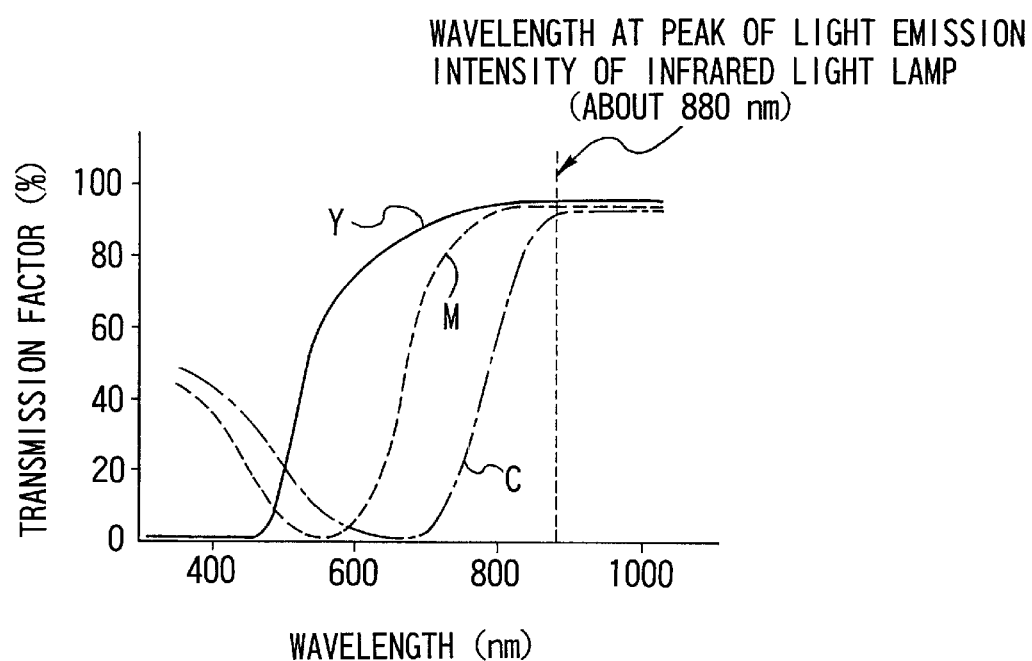
FIG. 17 is a graph showing the spectral transmission factor characteristics of cyan, yellow and magenta color pigments of negative and positive color films, and the wavelength at a peak of the spectral intensity distribution of the infrared light lamp.

FIG. 16 shows the distributions of spectral sensitivity of the transmissive-original illuminating lamp 144 and that of the infrared light lamp 151. The characteristics of the lamps 144 and 151 are indicated respectively by a full line and a one-dot-chain line. FIG. 17 shows the spectral transmission factor characteristics of the cyan, yellow and magenta color pigments of the negative or positive color film, and the wavelength (about 880 nm) at the peak of light emission intensity of the infrared light lamp 151. As apparent from FIG. 17, in the case of an ordinary color film, the transmission factor at the wavelength of about 880 nm of any of these pigments is very high. The light flux of the infrared light lamp 151 is, therefore, almost completely transmitted irrespective of an image on the film.

The smuts and flaws on the transmissive original 42 are detected as follows.

First, a reflective-original illuminating lamp 145 which is arranged as shown in FIG. 15 and the transmissive-original illuminating lamp 144 are put out, and the infrared light lamp 151 is lighted up. The illumination light flux of the infrared lamp 151 having a characteristic as shown in FIG. 16 is uniformly diffused by the diffusing plate 143. The diffused light flux passes through the transmissive original 142. The light from the transmissive original 142 is reflected by the mirror 147 and the pair of mirrors 148 and passes through the image forming lens 149 to be projected on the CCD 150. Therefore, the illumination light flux of the infrared light lamp 151 passing through the transmissive original 142 passes irrespective of an image formed (as a photosensitive image) on the negative or positive transmissive original 142, as shown in FIG. 17. As a result, images of matters such as dust, smuts, flaws, etc., that physically block the optical path are projected as shadows on the CCD 150.

The shadow image parts caused by smuts, flaws, or the like and formed by the infrared light lamp 151 are subjected to an interpolation process with normal image parts around them, so that an adverse effect of smuts, flaws or the like can be mitigated. In this instance, the position of such a smut or flaw as detected by the infrared light lamp 151 must exactly coincide with the actual position of the smut, flaw or the like. Therefore, in a case where the first-time scanning is made with the transmissive-original illuminating lamp 144 and the second-time scanning is made with the infrared light lamp 151, the smut, flaw or the like can be accurately detected by carrying out the positioning control as described in the first embodiment in the foregoing.

In accordance with the arrangement of each of the embodiments disclosed, the repeatability of operation can be enhanced by adjusting reading positions of scanning repeated for a plurality of times.

The present invention should not be construed to be limited to the apparatus and the method for attaining the first to third embodiments as described above. Such an arrangement as to attain the above embodiments by supplying the system or a computer (CPU or MPU) disposed within the apparatus with program codes of software for realizing the above embodiments and causing the system or the computer to operate various devices in accordance with the program codes of software is also included in the scope of the invention.

Further, in that instance, the program codes themselves serve to realize the functions of each of the above embodiments. Thus, the program codes themselves, and a means for supplying the program codes to the computer, i.e., a storage medium which stores therein the program codes, are included in the scope of the invention.

The storage medium which stores therein the program codes can be selected from among various media, such as a floppy disk, a hard disk, an optical disk, a magneto-optical disk, a CD-ROM, a magnetic tape, a nonvolatile memory card, a ROM, etc.

Further, not only in a case where the above embodiments are realized by the computer controlling the various devices in accordance with only the program codes as supplied, but also in a case where the above embodiments are realized by the program codes cooperating with an OS (operating system) operating on the computer or with another application software, such program codes are included in the scope of the invention.

Further, in a case where, after the program codes as supplied are stored in a memory provided in a function extending board of the computer or a function extending unit connected to the computer, a CPU or the like provided on the function extending board or the function extending unit performs a part or the whole of the actual processes according to instructions of the program codes, such program codes are also included in the scope of the invention.

What is claimed is:

1. An image input apparatus comprising:

an image sensor arranged to read an original image to convert the original image into an electrical signal;

a moving device that moves the original image and said image sensor relative to each other, said moving device including a plurality of gears, and the characteristic of said moving device includes backlash of said plurality of gears;

a control device that, when said moving device moves one and the same portion of the original image and said image sensor relative to each other a plural number of times, controls the plural-number-th-time movement according to a characteristic of said moving device;

a driving pulse supply device that supplies a driving pulse signal for driving said moving device, wherein said control device controls the number of pulses of the driving pulse signal to be supplied to said moving device; and a synchronizing signal supply device that supplies a synchronizing signal serving as reference for image reading by said image sensor, wherein, prior to starting of image reading for the plural-number-th time, said control device causes said driving pulse supply device to supply to said moving device a driving pulse signal of a number of pulses obtained by adding together (i) the number of pulses of the driving pulse signal supplied to said moving device from said driving pulse supply device during a period for which movement by said moving device is effected from a first-time reading start position to a first-time reading end position, (ii) the number of pulses of the driving pulse signal corresponding to the backlash, and (iii) the number of pulses of the driving pulse signal supplied to said moving device from said driving pulse supply device during a period from a point of time when the synchronizing signal is outputted immediately before movement by said moving device reaches the first-time reading start position to a point of time when movement by said moving device reaches the first-time reading start position.

2. An image input apparatus according to claim 1 wherein said moving device moves the original image and said image sensor relative to each other in a sub-scanning direction of said image sensor.

3. An image input apparatus according to claim 1 wherein said control device obtains the number of pulses of the driving pulse signal supplied to said moving device from said driving pulse supply device during a period for which movement by said moving device is effected from the first-time reading start position to the first-time reading end position, by computing a difference between (i) the number of pulses of the driving pulse signal supplied to said moving device from said driving pulse supply device during a period for which movement by said moving device is effected up to the first-time reading end position after the synchronizing signal is outputted at a predetermined reference position and (ii) the number of pulses of the driving pulse signal supplied to said moving device from said driving pulse supply device during a period for which movement by said moving device is effected up to the first-time reading start position after the synchronizing signal is outputted at the predetermined reference position.

4. An image input apparatus according to claim 1 wherein said moving device includes a pulse motor.

5. An image input apparatus according to claim 1 further comprising an image processing device that combines images read by said image sensor during movement by said moving device effected the plurality of times.

6. An image input apparatus according to claim 1 further comprising an image processing device that adds and averages images read by said image sensor during movement by said moving device effected the plurality of times.

7. An image input apparatus according to claim 1 further comprising a pixel shifting device that reads images at pixel positions shifting from each other in a main scanning direction of said image sensor during movement by said moving device effected the plurality of times.

8. An image input apparatus according to claim 1 further comprising a detecting device that detects smuts, flaws or the like on the original image.

9. An image input apparatus according to claim 1, wherein said detecting device detects smuts, flaws or the like on the original image from image data read by said image sensor when the original image is illuminated with infrared light.

10. A control method for controlling an image input apparatus having an image sensor arranged to read an original image to convert the original image into an electrical signal, and a moving device that moves the original image and said image sensor relative to each other, said control method comprising the steps of:

when said moving device moves one and the same portion of the original image and said image sensor relative to each other a plural number of times, controlling the plural-number-th-time movement according to a characteristic of said moving device, wherein said moving device includes a plurality of gears, and the characteristic of said moving device includes backlash of said plurality of gears;

supplying a driving pulse signal for driving said moving device by driving pulse supply device, and controlling the number of pulses of the driving pulse signal to be supplied to said moving device by said driving pulse supply device; and supplying a synchronizing signal serving as reference for image reading by said image sensor, and, prior to starting of image reading for the plural-number-th time, causing said driving pulse supply device to supply to said moving device a driving pulse signal of a number of pulses obtained by adding together (i) the number of pulses of the driving pulse signal supplied to said moving device from said driving pulse supply device during a period for which movement by said moving device is effected from a first-time reading start position to a first-time reading end position, (ii) the number of pulses of the driving pulse signal corresponding to the backlash, and (iii) the number of pulses of the driving pulse signal supplied to said moving device from said driving pulse supply device during a period from a point of time when the synchronizing signal is outputted immediately before movement by said moving device reaches the first-time reading start position to a point of time when movement by said moving device reaches the first-time reading start position.

11. A control method according to claim 10, wherein said moving device moves the original image and said image sensor relative to each other in a sub-scanning direction of said image sensor.

12. A control method according to claim 10, further comprising a the step of obtaining the number of pulses of the driving pulse signal supplied to said moving device from said driving pulse supply device during a period for which movement by said moving device is effected from the first-time reading start position to the first-time reading end position, by computing a difference between (i) the number of pulses of the driving pulse signal supplied to said moving device from said driving pulse supply device during a period for which movement by said moving device is effected up to the first-time reading end position after the synchronizing signal is outputted at a predetermined reference position and (ii) the number of pulses of the driving pulse signal supplied to said moving device from said driving pulse supply device during a period for which movement by said moving device is effected up to the first-time reading start position after the synchronizing signal is outputted at the predetermined reference position.

13. A control method according to claim 10, wherein said moving device includes a pulse motor.

14. A control method according to claim 10, further comprising a the step of combining images read by said image sensor during movement by said moving device effected the plurality of times.

15. A control method according to claim 10, further comprising the step of adding and averaging images read by said image sensor during movement by said moving device effected the plurality of times.

16. A control method according to claim 10, further comprising the step of reading images at pixel positions shifting from each other in a main scanning direction of said image sensor during movement by said moving device effected the plurality of times.

17. A control method according to claim 10, further comprising the step of detecting smuts, flaws or the like on the original image.

18. A control method according to claim 10, further comprising the step of detecting smuts, flaws or the like on the original image from image data read by said image sensor when the original image is illuminated with infrared light.

* * * * *

UNITED STATES PATENT AND TRADEMARK OFFICE
CERTIFICATE OF CORRECTION

PATENT NO. : 6,633,415 B1
DATED : October 14, 2003
INVENTOR(S) : Shoji Arafune et al.

It is certified that error appears in the above-identified patent and that said Letters Patent is hereby corrected as shown below:

Column 6,
Line 31, delete "and-averaging" and insert -- and averaging --.

Column 7,
Line 27, delete "the, two pixel" and insert -- the two pixel --.

Column 12,
Line 28, delete "is not Or limited" and insert -- is not limited --.

Column 16,
Lines 22 and 42, delete "comprising a the step" and insert -- comprising the step --.

Signed and Sealed this

Fourth Day of April, 2006

JON W. DUDAS
*Director of the United States Patent and Trademark Office*